Feb. 6, 1934.  R. BARTHELEMY  1,945,723
SYNCHRONOUS INDUCTION MOTOR
Filed Feb. 24, 1932
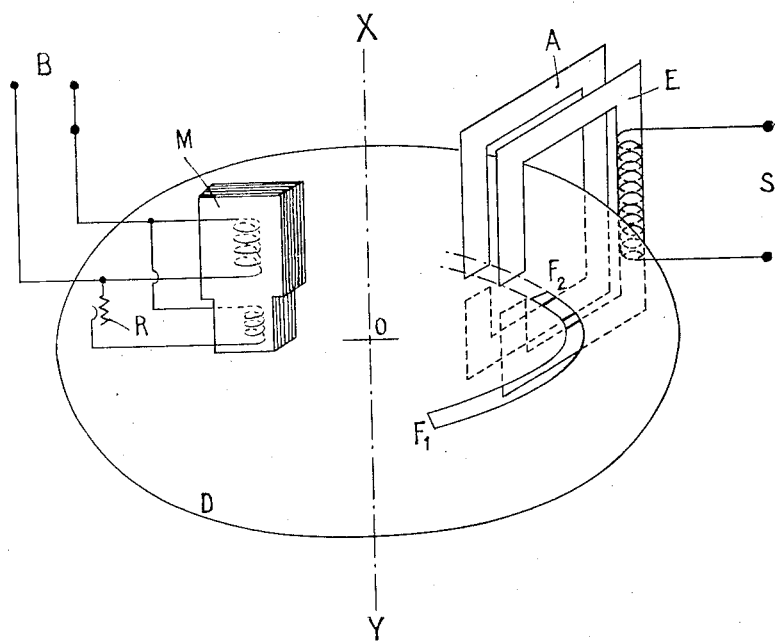
René Barthelemy
INVENTOR
By (signature)
his ATTY.

Patented Feb. 6, 1934

1,945,723

UNITED STATES PATENT OFFICE

1,945,723

SYNCHRONOUS INDUCTION-MOTOR

René Barthelemy, Fontenay aux Roses, France, assignor to Compagnie Pour La Fabrication Des Compteurs Et Material D'Usines a Gaz, Montrouge, France Application February 24, 1932, Serial No. 594,840, and in France February 28, 1931

4 Claims. (Cl. 172—293)

It is well known that most of the synchronous motors utilized in television, telecinematographic and like receivers comprise an auxiliary motor substantially to compensate for losses, and the speed of which can be regulated to approximately the speed of synchronization, and, mounted on the same shaft, a synchronous motor which receives the alternating synchronizing current and which, without exerting any appreciable force, enables the phase of rotation to be fixed when the first motor is regulated to the speed of synchronism.

The necessity of avoiding variable mechanical frictions in order not to set up variations of the resisting couple leads to the provision of light moving members, supported by fine pivots mounted generally on rubies and in the suppression of all rubbing connection to conduct the current to the moving part.

The present invention relates to a synchronized motor system which realizes these conditions and of which the new principle resides essentially in the synchronous motor part, the auxiliary motor being of any type whatsoever but preferably being chosen from among asynchronous motors of the type known as the "squirrel cage" or induction disc or rotor which avoids the necessity of leading current to the movable part.

The invention consists in transmitting, by induction, to a movable circuit, fixed to the shaft to be synchronized, the synchronization current and in displacing this circuit in a suitable magnetic field, generally a continuous field provided by a magnet or an electro-magnet. Thus there is provided a true synchronous motor, with moving armature, without the use of friction brushes or the like which ordinarily are used to feed the current to the rotor.

Obviously, the same armature, or the whole or at least a part of the same can be subjected at the same time to a turning field which gives the auxiliary couple to balance out the friction. There is thus provided a motor with its moving part as much reduced as possible, and causing minimum of losses by friction; which enables the phase of rotation to be maintained with great ease, this being an essential condition for the application of this synchronized motor to television purposes, such, for example, as the rotation of a perforated disc or of mirrors or of any other optical system.

The figure shows by way of example a very simple embodiment of this invention.

The conducting disc D is fixed on a shaft XY at a point O and is subjected to the action of an induction motor M similar, for example, to the motors which are employed in alternating current electricity meters, and fed from any suitable alternating source B.

There is thus produced a couple motor which, in the present case, is the auxiliary couple intended to balance out the losses at the speed of synchronization. This couple is adjustable, for example, by means of a resistance R.

The disc passes between the poles of an electro-magnet E fed by the alternating or wave form synchronization current supplied in the usual manner by a wave receiver operated by the television transmitter, and also between the pole pieces of a magnet A placed close to an electro-magnet E.

A current is induced in the disc by the fluctuations of the synchronization current, having in the present case a period—or pseudo-period—equal to that of the rotation of the disc. Passing into the field of the magnet, the current fluctuations will give either a driving couple or a resisting couple according to their sense. Their mean action would be nil if the induced currents always presented themselves between the poles in the same manner. A dissymmetry will be introduced in the structure of the disc by the provision of a fine slot $F_1$, $F_2$ which passes between the poles of E and of A. No current is induced in the disc while the slot is between the poles.

It will be seen that a relation in established between the mean couple given by the assembly A and E, and the position of the slot $F_1$, $F_2$, that is to say, between the phase of rotation and the phase of the synchronizing current. Thus, if the slot presents itself between the poles at the same time as the production of the resisting couple this will have practically no effect except that the motor couple will come into action and the disc will tend to increase its speed. However, upon a small advance in phase the resisting couple will reappear and the motor couple will diminish. There will thus exist a state of equilibrium which determines the phase with as great precision as the duration of the synchronization impulses permits. These impulses succeed one another at a speed of about sixteen per second (once per turn). The length of the slot is, it will be appreciated, determined by the length of the synchronizing signal.

The fields created by the magnets A and the electromagnet E each produce an important braking couple which is not troublesome but useful in diminishing the relative influence of the mechanical friction on the determination of the phase of rotation.

What I claim is:

1. A synchronized electric motor having a rotating armature of conducting material, electromagnetic means for exerting a driving couple on said armature, an electromagnet energized by the synchronizing current for inducing currents in said armature in accordance with the synchronizing current, a polarized magnetic core near said electromagnet for producing a constant field acting on said induced currents to maintain in synchronism the rotation of said armature, said armature having an arc-shaped slot concentric with its axis of rotation and passing during each revolution of said armature between the poles of said electromagnet and magnetic core, whereby the phase of rotation of the armature depends on the phase of the synchronizing current.

2. A synchronized electric motor having a rotating disc of conducting material, electromagnetic means for exerting a driving couple on said rotating disc, an electromagnet energized by the synchronizing current for inducing in said disc currents in accordance with the synchronizing current, a polarized magnetic core near said electromagnet for producing a constant field acting on said induced currents to maintain in synchronism the rotation of said disc, said disc having an arc-shaped slot formed therein concentrically with its axis of rotation and passing during each revolution of said disc between the poles of said electromagnet and said magnetic core, whereby the phase of rotation of said disc depends on the phase of the synchronizing current.

3. A synchronized electric motor comprising a rotating disc of conducting material, electromagnetic means for exerting a driving couple on said disc, an electromagnet energized by the synchronizing current for inducing in said disc currents in accordance with the synchronizing current, a magnet near said electromagnet for producing a constant field acting on said induced currents to maintain said disc in synchronous rotation, said disc having an arc-shaped slot formed therein concentrically with its axis of rotation and passing during each revolution of the disc between the poles of said electromagnet and said magnet, whereby the phase of rotation of said disc depends on the phase of the synchronized current.

4. A synchronized electric motor comprising a rotating disc of conducting material, electromagnetic means for exerting a driving couple on said disc, a first electromagnet energized by the synchronizing current for inducing in said disc currents in accordance with the synchronizing current, a second electromagnet near the said first electromagnet energized by continuous current for producing a constant field acting on said induced currents to maintain the rotation of said disc in synchronism, said disc having an arc-shaped slot formed therein concentrically with its axis of rotation and passing during each revolution of the disc between the poles of said electromagnets, whereby the phase of rotation of the disc depends on the phase of the synchronizing current.

RENÉ BARTHELEMY.